April 5, 1966 A. M. BARRETT, JR 3,244,250
ELECTRICAL STEERING DEVICE FOR MOBILE UNIT
Filed Sept. 21, 1962 4 Sheets-Sheet 1

Inventor
Arthur M. Barrett, Jr.
By Brown, Jackson, Boettcher & Dienner
Attys.

April 5, 1966  A. M. BARRETT, JR  3,244,250
ELECTRICAL STEERING DEVICE FOR MOBILE UNIT
Filed Sept. 21, 1962  4 Sheets-Sheet 2

Inventor
Arthur M. Barrett, Jr.
By Brown, Jackson, Boettcher & Dienner
Attys.

April 5, 1966  A. M. BARRETT, JR  3,244,250
ELECTRICAL STEERING DEVICE FOR MOBILE UNIT
Filed Sept. 21, 1962  4 Sheets-Sheet 4

Inventor
Arthur M. Barrett, Jr.
By Brown, Jackson,
Boettcher + Dienner
Attys.

United States Patent Office 3,244,250
Patented Apr. 5, 1966

3,244,250
ELECTRICAL STEERING DEVICE FOR
MOBILE UNIT
Arthur M. Barrett, Jr., Northbrook, Ill., assignor to Barrett Electronics Corporation, Northbrook, Ill., a corporation of Illinois
Filed Sept. 21, 1962, Ser. No. 225,317
5 Claims. (Cl. 180—79.1)

The present invention relates to steering apparatus for mobile units, and more particularly to electrical steering mechanism for wheeled vehicles.

The steering of wheeled vehicles, particularly vehicles of the materials-handling type designed for carrying heavy loads, presents certain practical difficulties. It is advantageous in four-wheeled vehicles of this type to have all four wheels positively steerable, so as to increase the maneuverability and ease of operation of the vehicle. This is important because such vehicles are commonly operated in restricted spaces, as in narrow aisles, or along paths requiring movement among fixed objects. Four-wheel steering, however, requires more complicated means for steering than in the case of two-wheel steering arrangements. The complication is compounded by the fact that the leading and trailing pairs of wheels must be turned in opposite directions in order to effect turning of the vehicle. Because of the weight of the loads which the vehicles carry, turning of even two wheels by manual means requires apparatus which will increase or multiply the manual power applied, in order to effect the desired directional turning of the wheels by overcoming the high frictional forces resulting from the load pressure applied to the wheels. This of course is even more the case when four wheels are to be turned. Mechanical devices may of course be employed to obtain a mechanical advantage so that the wheels may be turned with the application of relatively little force. Hydraulic means may also be employed for this purpose. Mechanical devices, such as gearing or linkage or combinations thereof, are subject to backlash and overshooting, and also to a certain amount of lost motion and play due to necessary clearances and tolerances, resulting in inexact positioning of the wheels and lowered efficiency. Hydraulic systems involve other drawbacks, the chief of which are the power requirements for providing and maintaining the necessary pressure in the hydraulic system, and the space requirements occasioned by the hydraulic equipment, with the consequence that apparatus employed to obtain the desired steering control is relatively expensive, and considerably more costly than that of the present invention. A hydraulic arrangement may readily be employed with the electrical apparatus of this invention to provide the power system for effecting steering.

It is furthermore advantageous to provide for steering of the vehicle in a plurality of different modes, so as to increase the flexibility of operation or versatility of the vehicle. Two of such modes may be along the longitudinal and lateral axes, respectively, of the vehicle with means for selecting either of these two modes alternatively. Another mode which is desirable is the "crabbing" mode, that is, obliquely or otherwise transversely of either of the longitudinal or lateral axes of the vehicle. Another steering mode for such a materials-handling vehicle which is of great convenience in operation of the vehicle is that effecting turning of the vehicle about a vertical axis falling within the area occupied by the vehicle, or centrally of the wheels. This permits turning of the vehicle through any angle from any direction of travel to any other direction, in a minimum area. It is desirable that the four-wheel steering arrangement be readily alterable to a two-wheel steering system, so that back-and-forth maneuvering may be done in close quarters allowing only slight lateral clearance insufficient to permit the vehicle to turn with all four wheels steering the vehicle. Another desirable feature of steering apparatus for materials-handling vehicles is that it be responsive to control by automatic guidance systems which have been provided for steering such vehicles along predeterminable paths.

By the electrical arrangement of this invention, the disadvantages of mechanical or hydraulic steering apparatus are largely if not completely done away with, the relatively complicated, trouble-inviting, space-consuming mechanism and devices of such apparatus being replaced by simple, compact, trouble-free electrical devices, specifically synchros or selsyns and associated elements, and easily installed wiring connecting them together. The mechanical elements required to complete the arrangement are of a simple type. Precise and instantaneous control of the directional turning of the wheels is provided by the electrical apparatus, obtaining maximum efficiency in steering of the vehicle. The electrical steering apparatus also makes simple and easy the differential turning of the wheels for the greatest ease and efficiency in tracking of the vehicle about a turn. Provisions for differential turning of the wheels in mechanical and hydraulic steering systems are relatively involved, particularly when all four wheels are used in steering. The electrical steering system of the invention readily lends itself to various steering modes, and allows easy changing from one mode to another, or, in other words, affords great selectivity in steering modes. It will be evident that the electrical steering apparatus of the invention is very versatile although simple in structure and operation, in contrast to the cumbersome and complex construction which would be required to achieve the same results, if indeed they could be achieved, with a mechanical or hydraulic steering system. The present system requires but little power, readily supplied from the power source used for driving the vehicle. When in addition it is noted that the electrical equipment is considerably less expensive than such other systems, it will be apparent that the present invention provides a steering system having many points of superiority over mechanical or hydraulic arrangements.

It is an important object of the invention to provide an electrical steering mechanism for wheeled vehicles which is simple and efficient in construction and operation and avoids the cumbersomeness and complexity of other types of steering mechanisms.

Another object is the provision of an electrical steering apparatus for wheeled vehicles which is relatively cheap in construction, requires little power to operate, and is compact to allow of minimum space requirements for minimizing the vehicle size.

It is another object to provide an electrical steering apparatus for wheeled vehicles which is adapted for use in a plurality of different steering modes.

Another object is the provision of an electrical steering arrangement for wheeled vehicles which effects differential turning of the steerable wheels for maximum ease in steering of the vehicle, the difference in steering angles of the wheels being predetermined.

A further object is the provision of an electrical steering system for wheeled vehicles which affords precise control of the steerable wheels.

It is also an object of the invention to provide an electrical steering apparatus for wheeled vehicles which provides for guiding the vehicles in any of a number of diverse steering modes.

Another object is the provision of an electrical steering system for wheeled vehicles which may be employed with and controlled by an electrical guidance system to follow a predeterminable path.

Other and further objects, advantages, and features of the invention will be apparent to those skilled in the art from the following detailed description, taken in conjunction with the accompanying drawings, in which.

Figures 1, 2, 12, 13, 14, 15:
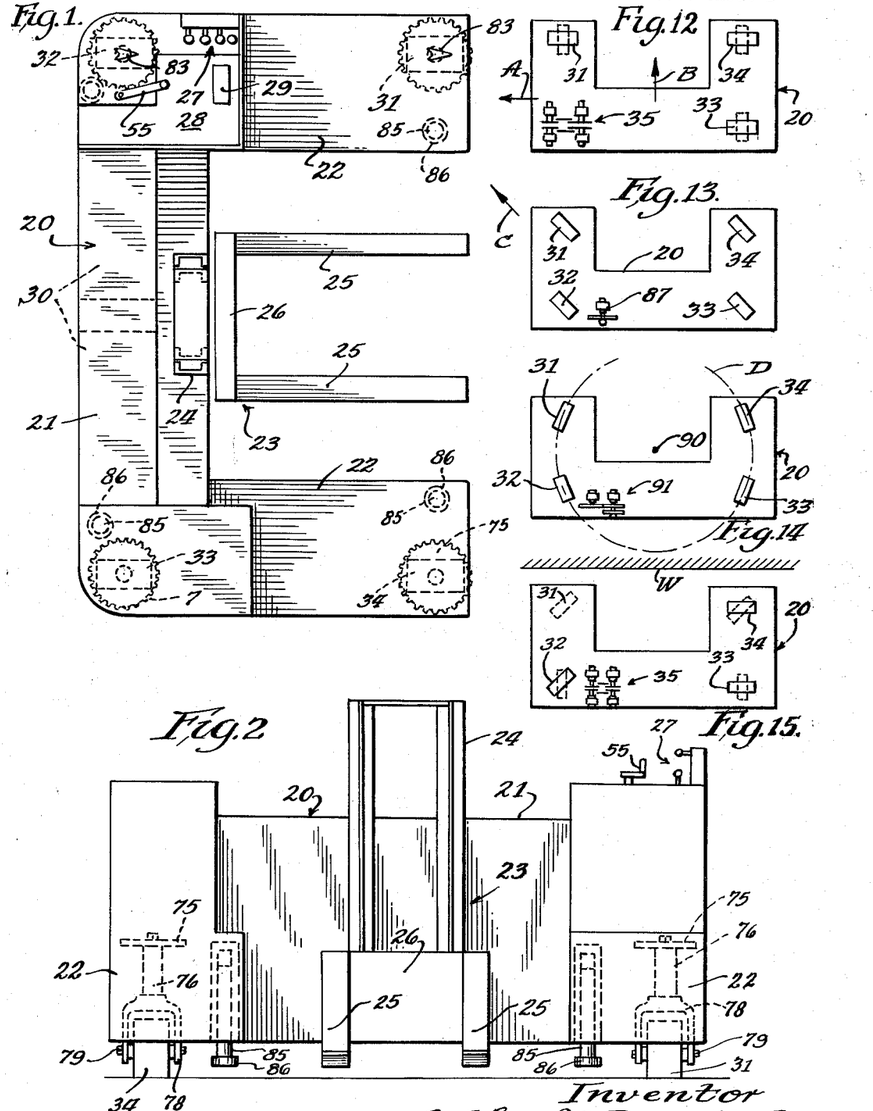
FIGURE 1 is a diagrammatic plan view of a materials-handling type of vehicle employing the invention.
FIGURE 2 is a diagrammatic elevational view of the vehicle of FIGURE 1.
FIGURE 12 is a diagrammatic plan view on a small scale of the vehicle illustrating the longitudinal and transverse steering modes.
FIGURE 13 is a view similar to FIGURE 12, but illustrating the crab steering mode of the vehicle.
FIGURE 14 is a view similar to FIGURES 12 and 13, but illustrating the rotational steering mode.
FIGURE 15 is a view similar to FIGURES 12 to 14, but illustrating a two-wheel steering mode.

Referring to the drawings, there is shown in FIGURES 1 and 2 a vehicle generally designated 20 employing the invention. The vehicle is intended for use in handling large, heavy, and cumbersome articles, such as missiles, beyond the capabilities of the common type of lift truck, for example. The vehicle 20 has a main body which is substantially U-shaped in plan, as evident from FIGURE 1, with a connecting or central portion 21 from the opposite ends of which extend substantially parallel side portions 22 of less length than the central portion. For convenience, the portions 22 may be considered as extending forwardly from the central body portion, or in other words, the side of the vehicle defined by the ends of the side portions 22 may be taken as the front, with a forwardly opening recess therein as viewed in plan. In this recess, between the side portions 22, there is securely mounted on the central portion 21 in any suitable manner a fork lift apparatus generally designated 23 including a tiltable mast structure 24 and a pair of fork arms 25 mounted on a crosspiece 26 arranged to be moved vertically on the mast structure by any conventional means (not shown). The fork arms 25 are movable on the crosspiece 26 toward and from each other. The fork lift apparatus 23 is projectable from the central body portion to a position with the forks extending forwardly of the side portions 22 of the body, or out of the body recess, so that articles below the level of the upper surfaces of the body side portions 22 may be engaged by the fork arms and lifted to a level above the side portions 22 and retracted to a position extending over the portions 22. Similarly, objects carried on or over the body side portions 22, or disposed above the level thereof, may be lowered to the level of the surface upon which the vehicle operates. Suitable control means 27 for operation of the fork apparatus and of the vehicle drive means are mounted on the vehicle convenient to an operator's station 28 on the floor of which is a dead-man brake pedal 29. Power for driving the vehicle is supplied by batteries 30 in compartments defined by the central body portion 21. The battery power may be utilized to operate the fork apparatus, either directly or indirectly, and is also employed to operate the steering apparatus.

The vehicle is supported on four wheels at the corners thereof, designated 31, 32, 33 and 34, respectively, in counterclockwise order beginning with the left front wheel. Each of the four wheels is mounted for full 360° rotation or swivelling about a vertical axis, in a manner hereinafter explained. Certain of the wheels, in this case the wheels 32 and 33, are driving wheels driven by any conventional means provided for this purpose, powered by the batteries 30, to move the vehicle under control of the operator. The starting, stopping, and speed of the vehicle are controlled by the operator by the drive controls 27 and brake pedal 29, but steering of the vehicle, or in other words turning of the wheels to select a path or to maneuver the vehicle into a desired position, is effected by steering control means generally designated 35, best shown in FIGURES 3, 4, and 7.

The steering control is disposed conveniently adjacent the operator's station 28, comprising two pairs of synchros 36, 37 and 38, 39. Alternating current for the synchro transmitters may conveniently be provided by the batteries 30, through any suitable converter (not shown), the two pairs of transmitters 36, 37 and 38, 39 being alternatively connectible to the batteries through the converter so that only one pair is energized at any one time. The synchro transmitters are mounted on a support plate 40 by means of brackets 41 bolted or otherwise secured to the plate, the transmitters of each pair being spaced laterally or radially from each other with the rotor shafts thereof substantially parallel. In the present instance, the transmitters are arranged so that one transmitter of each pair is in axial alignment with a transmitter of the other pair. The pair of synchro transmitters 36 and 37 is employed for steering of the vehicle in the mode along the longitudinal axis of the vehicle as indicated by the arrow A in FIGURE 12, while the transmitters 38 and 39 are employed in steering the vehicle in the direction of the transverse axis, as indicated by the arrow B in FIGURE 12, this latter mode B, it will be apparent, being that in which the open side of the U-shaped body is taken as the front. The rotor shafts 43 of each pair of synchro transmitters are connected for predetermined differential rotation in either direction by a linkage which is in effect a miniature Ackerman type linkage.

On the shaft of the transmitter 36 is secured a sector-shaped driving plate 44 having a lever arm 45 integral therewith projecting radially oppositely therefrom. On the shaft of the other transmitter 37 of the pair controlling steering in mode A there is secured a radially extending arm 46. A link 47 extends between and is pivotally connected to the free ends of the arms 45 and 46. The linkage between the transmitters 36 and 37 is arranged and proportioned so that a 45° rotation of the arm 45 clockwise as viewed in FIGURES 4 and 8 will effect a 25° clockwise rotation of the arm 46, with corresponding rotation of the respective shafts, while a 25° counterclockwise rotation of the arm 45 will cause a 45° rotation in the corresponding direction of the arm 46 from the neutral position.

The other pair of synchro transmitters 38 and 39 is linked in a similar manner, but for more restricted rotation. On the shaft 43 of the transmitter 38, axially aligned with the shaft of the transmitter 36, there is fastened a sector-shaped drive plate 48 of substantially the same radial extent as the plate 44, but of less arcuate or angular extent, having a lever arm 49 integral therewith extending radially from its vertex. A radially extending arm 50 similar to the arm 46 is fixed on the shaft 43 of the transmitter 39, the free ends of the arms 49 and 50 being connected by a link 51 pivotally connected thereto at its ends. It will be evident that rotation of the plate 48 in either direction will effect rotation in the same direction of the arm 50, but as explained hereinafter in connection with FIGURES 8 and 9, the rotary displacement of one of the two shafts 43 is 15° when that of the other is 7°.

Adjustable stop means are provided by which the maximum rotation of the transmitter shafts may be limited and controlled. As shown, the stop means take the form of a pair of Z-shaped brackets 52 secured on the support plate 40 as by bolting or welding, each having a horizontal portion projecting over one of the links 47 and 51. A screw 53 is threadedly mounted in the horizontal bracket portion for adjustment in the vertical plane of the underlying link 47 or 51. As will be evident from FIGURES 8 and 9, the screws 53 are in the present instance adjusted to allow maximum rotation of the transmitter shafts for the respective proportions of the parts of the two linkages, limiting movement of the linkages to slightly short of dead center positions in either direction of movement.

A welded or otherwise suitably formed mount 54 is provided on the support plate 40 to support means for actuating the linkages of the two pairs of synchro transmitters and effect the desired positioning of the transmitters for effecting a particular turn of the vehicle. A manually operable crank or handle 55 is fastened on the upper end of a vertical shaft 56 rotatable in a bearing 57 provided on the mount 54. On its lower end, the shaft 56 carries a pinion 58 with which meshes a gear 59 on a shaft 60 parallel to the shaft 56 and journaled in a suitable bearing 61. The shaft 60 extends vertically below the gear 59, between the planes of the plates 44 and 48, and on its lower end carries a friction disk or wheel 62 which engages with the plates in good frictional engagement. Rotation of the steering handle 55 causes rotation of the plates 44 and 48 to turn the shafts of the synchro transmitters through the miniature Ackerman linkages, movement of the handle 55 being transmitted to the sector plates through the pinion 58, gear 59, shaft 60, and friction disk 62. In the arrangement disclosed, clockwise turning of the handle results in clockwise rotation of the sector plate 44 and counterclockwise rotation of plate 48. It will be apparent that the simultaneous rotation of both plates, and therefore actuation of both linkages, causes no difficulty because only one of the pairs of transmitters is energized, so that the other has no effect on the steering. The ratio of the pinion 58 and gear 59 is substantially 1:2, so that the steering handle 55 moves through about twice the arc through which it is desired to turn one or the other of the plates 44 and 48.

Figure 8:
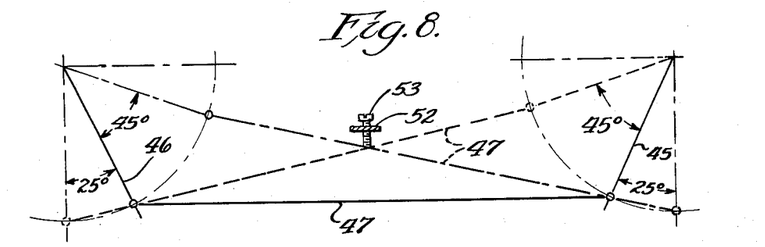
FIGURE 8 is a diagrammatic illustration of the neutral and extreme opposite positions of the linkage effecting differential positioning of a pair of synchro transmitters employed in the steering mode longitudinally of the vehicle.

As hereinafter more fully explained, each of the transmitters controls the directional turning of two of the vehicle wheels, the two wheels in each case being those at one side or the other of the vehicle axis corresponding to the steering mode being followed. In steering mode A, for example, transmitter 36 operates to effect turning of wheels 31 and 34, and transmitter 37 controls turning of wheels 32 and 33, while in steering mode B, transmitter 38 controls wheels 31 and 32, and transmitter 39 controls wheels 33 and 34. The steering control means 35 effects differential steering of the wheels to achieve proper tracking of all the wheels about a single turning center so that the vehicle will turn smoothly and surely in the intended path. Referring to FIGURE 8, showing diagrammatically the actuating linkage for the first pair of transmitters 36 and 37 used in steering mode A, it will be seen that from the neutral position of the linkage, shown in solid lines, the linkage may be moved to rotate the synchro transmitter shafts in either direction, but that the maximum arc permitted either shaft is 45°. Clockwise rotation of the shafts by lever arms 45 and 46, effected by clockwise rotation of the steering handle 55 as previously explained, is employed for a right turn of the vehicle 20, while counterclockwise turning of the shafts effects a left turn.

Rotation of the lever arm 45 clockwise 45° from its neutral or full-line position at shown in FIGURE 8 to the dotted-line position effects clockwise rotation of the arm 46 through an arc of only 25° from its full-line position to its dotted-line position, by reason of the arrangement and proportions of the parts of the linkage. The wheels controlled by the respective transmitters 36 and 37 are turned about their vertical swivel axes through the same arcs as the transmitter shafts 43, but in opposite directions, relative to the axis of the vehicle corresponding to the steering mode. The wheels 31 and 34 controlled by the transmitter 36 are therefore turned through 45° from their straight-ahead positions, the wheel 31 clockwise and the wheel 34 counterclockwise, to direct the vehicle to the right. It will be noted from FIGURES 1 and 12 that these are the inside wheels for a right turn in steering mode A. The wheels 32 and 33 controlled by the synchro transmitters 37 are turned in the same directions, respectively, as the wheels 31 and 34, but through arcs of only 25°, corresponding to the rotation of the transmitter shaft. The wheels 32 and 33 are the outside wheels in a right turn in steering mode A, and hence in accordance with accepted steering principles are not turned as sharply as the inside wheels.

For a left turn of the vehicle 20 in steering mode A, the lever arm 45 is turned counterclockwise from its neutral or full-line position as shown in FIGURE 8, corresponding to the straight-ahead position of wheels. In this case, the arm 45 cannot move through more than 25°, but this movement results in a maximum rotation of 45° in a counterclockwise direction of the arm 46, the positions of the arms and link 47 in this extreme being shown in dot-dash lines. The wheels 32 and 33, now the inside wheels in the left turn, rotate through 45° from their straight-ahead positions, and the outside wheels 31 and 34 turn through 25°. The wheels 31 and 32 are rotated about their vertical axes in a counterclockwise direction, and the wheels 33 and 34 clockwise.

It will be seen that although the linkage proportions would allow only partial rotation of the arms 45 and 46, the stop screw 53 is adjusted to hold rotation below such limit. The rotation of 25° and 45° allowed by the screw is slightly less than would effect alignment or dead-center positioning of the link 47 with either arm 45 or 46. The rotation may be changed by varying the adjustment of stop screw 53, as is obvious. It may also be varied, of course, by a change in the proportions of the linkage parts.

Steering in steering mode B, along the transverse axis of the vehicle 20, is accomplished in substantially the same manner as in steering mode A. The first pair of synchro transmitters 36 and 37 are disconnected from the batteries 30, and the transmitters 38 and 39 are connected thereto so as to be energized. In this arrangement, the transmitter 38 is used to control the inside wheels 33 and 34 on a right turn, and the transmitter 39 to control the inside wheels 31 and 32 on a left turn.

Figure 9:
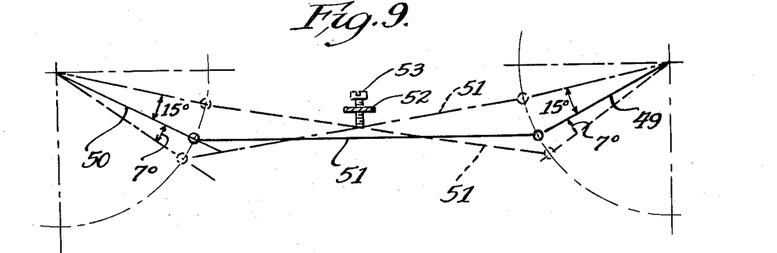
FIGURE 9 is a diagrammatic illustration similar to FIGURE 8, but of the linkage for another pair of synchrotransmitters employed in the steering mode transversely of the vehicle.

For a right turn, the handle 55 is turned clockwise, causing counterclockwise turning of the lever arm 49 of transmitter 38 a maximum of 15°, and corresponding turning of the arm 50, but through a maximum of 7°, as shown in dot-dash lines in FIGURE 9. The wheels 33 and 32 are rotated counterclockwise relative to the steering mode B axis, or transverse vehicle axis, 15° and 7°, respectively, while the wheels 34 and 31 are turned clockwise, also respectively through 15° and 7°. To turn the vehicle to the left in steering mode B, the steering handle is turned counterclockwise, turning the arm 49 clockwise a maximum of 7° from its full-line or neutral position as shown in FIGURE 9, and causing the arm 50 to be turned 15° counterclockwise by means of the link 51, as shown by the dot-dash lines in the figure. The wheels 31 and 32 controlled by transmitter 38, the inside wheels in a left turn, are turned about their vertical axes in 15° arcs, while the outside wheels 33 and 34, controlled by the transmitter 39, turn through arcs of only 7°, the degree of turning of the wheels corresponding in each case to the rotation of the shaft of the controlling transmitter. The wheels 31 and 34 turn counterclockwise, and the wheels 32 and 33 clockwise, through their respective angles or arcs. As with the linkage for transmitters 36 and 37, rotation permitted the shafts 43 of transmitters 38 and 39 may be varied by adjustment of the stop screw 53, as well as by changing the proportions of the arms and connecting link. As will be evident from FIGURE 9, the stop screw is positioned to be engaged by the link 51 in either direction of rotation before the link 51 can reach aligned or dead-center relation with either arm 49 or arm 50. Rotation of the shaft 43 of a synchro transmitter positions the rotor in correspondence to the desired position of the load, or vehicle wheel. This produces an output in the form of an order signal which is utilized as hereinafter explained.

Figures 3, 4:
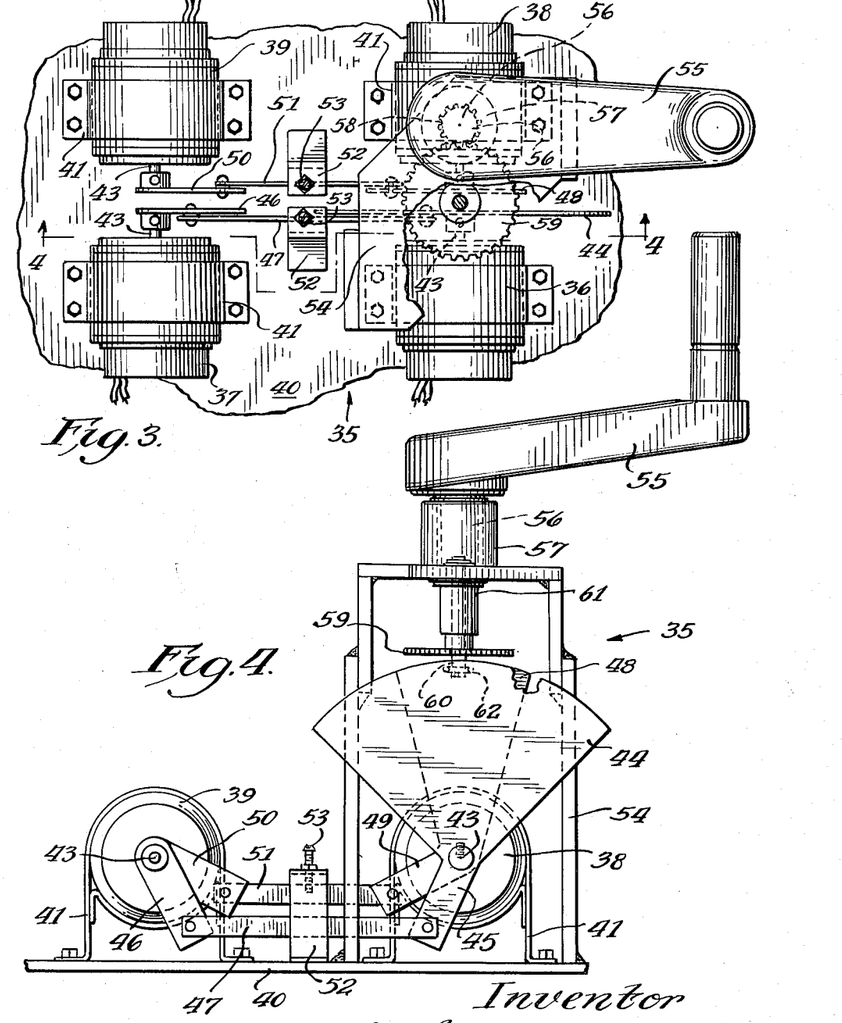
FIGURE 3 is an enlarged plan view of the steering control means.
FIGURE 4 is an elevational view of the steering control means, taken substantially as indicated by line 4—4 of FIGURE 3.
Figure 5:
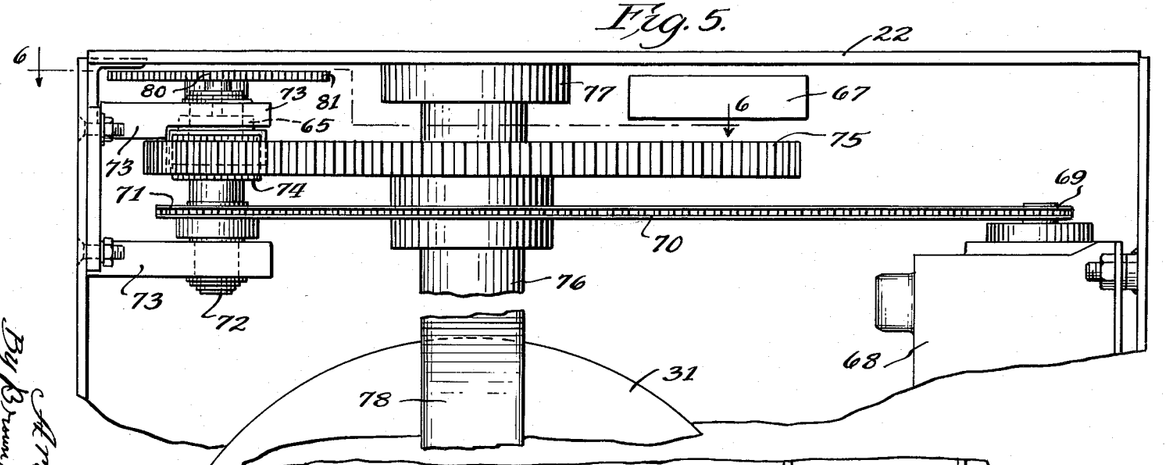
FIGURE 5 is a side elevational view of the mechanism for turning one of the steerable wheels of the vehicle.
Figure 6:
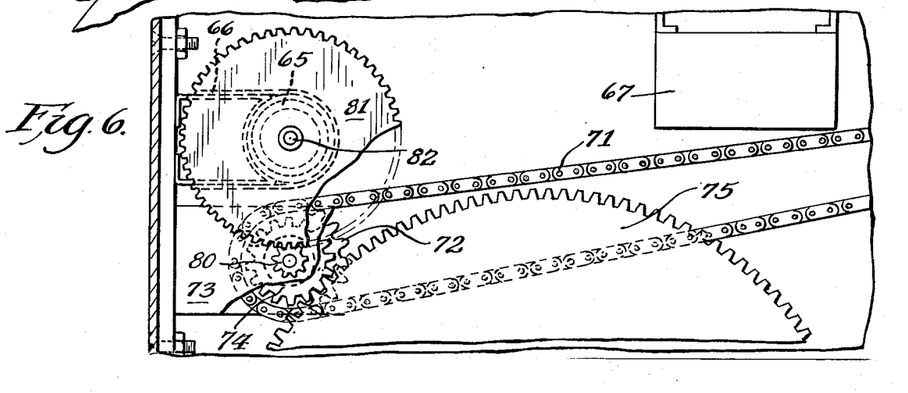
FIGURE 6 is a plan view of the mechanism of FIG 5.
Figures 7, 10, 11:
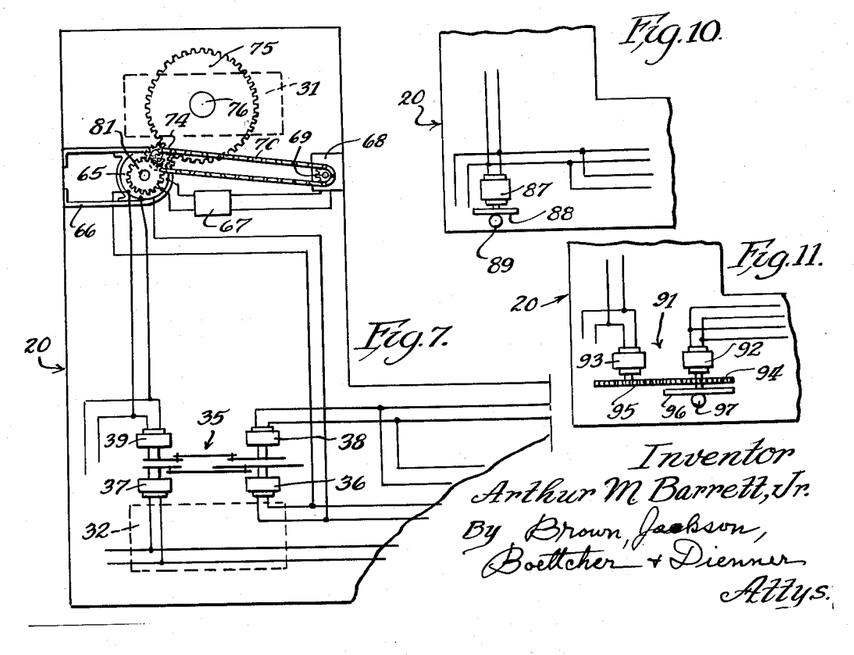
FIGURE 7 is a fragmentary plan view showing diagrammatically the connections between the steering control means and the wheel-turning mechanism.
FIGURE 10 is a fragmentary plan view similar to FIGURE 7, but showing a control arrangement for a crab steering mode.
FIGURE 11 is a view similar to FIGURE 10, but showing a control arrangement for a spinning or rotational steering mode.

Referring to FIGURES 3, 4, and 7, there is illustrated the mechanism for directional turning of the ground-engaging wheels of the vehicle under the control of the respective transmitters, specifically with respect to the wheel 31. A synchro receiver 65 is mounted adjacent wheel 31, as by means of a bracket 66 secured to a wall of the vehicle body. The receiver 65 is electrically connected in circuit with the transmitters 36 and 39, as clearly shown in FIGURE 7, and constitutes a servo-mechanism, controlled by the energized one of these transmitters, for positioning the wheel 31. The wheel is mechanically connected to the rotor of the receiver, as hereinafter explained, so that the position, or direction, of the wheel is always accurately represented by the position of the receiver motor. As already explained, the rotational positioning of the transmitter rotor results in an electrical output in the form of an order signal expressing the desired position of the wheel. The signal is fed to the synchro receiver or servo, resulting in a corresponding position signal across the stator of the receiver. When this signal differs from the actual position of the wheel 41, an alternating current error voltage is developed across the rotor of the receiver, the phase of this error signal or voltage depending on the angular or rotational direction in which the wheel must be moved to agree with the order signal from the controlling transmitter.

This error signal or voltage, representing the output of the receiver, is passed through a suitable amplifier 67 mounted adjacent and connected to the synchro receiver. The amplified signal is fed by the amplifier, retaining the phase distinction, to a suitable two-phase electric motor 68 connected thereto, and effects operation of the motor in the appropriate direction. A sprocket wheel 69 is fast on the shaft of the motor 68, which is preferably mounted on the vehicle with the shaft in vertical position. A sprocket chain 70 is trained about the sprocket 69 and a second sprocket wheel 71 secured on a vertical shaft 72 located adjacent the receiver 65, and suitably journaled in bearing blocks 73 supported from the vehicle. Fixed on the shaft 72 is gear 74 in mesh with a bull gear 75 which is secured on the vertical swivel shaft 76 of the wheel 31. The shaft 76 is mounted in suitable bearings, one of which is shown at 77, carried by the top plate of the side portion 22 of the vehicle body. At its lower end, the swivel shaft is appropriately formed to support the axle of wheel 31, such formation being illustrated in FIGURE 2 as a bifuricated construction 78, the opposite ends of the wheel axle 79 being engaged in the two branches thereof. It will be apparent that the amplified output signal of the syinchro receiver 65 drives the bull gear 75 to turn the wheel 31 to the position called for by the controlling transmitter 36 or 38, the signal driving the motor 68 which turns the gear 71 through the sprocket arrangement, and thus turns the gear 75 and the turning shaft 76 carrying the wheel. The receivers 65 for each pair of wheels controlled by a particular transmitter in either of modes A and B are connected to the controlling transmitter in opposed or reversed phase relative to each other, so as to effect the turning of the wheels of the pair in opposite directions although to the same angular extent, as described hereinabove.

On the upper end of the shaft 72 there is secured a pinion 80, which meshes with a gear 81 fixed on the shaft 82 of the synchro receiver, providing a feedback mechanism which turns the rotor of the receiver toward agreement with the positioning signal from the controlling transmitter. As the wheel 31 approaches the desired position, therefore, less and less power is supplied to the motor 68 because the error voltage developed in the receiver is decreasing. When the wheel 31 comes to the desired steering position, the error voltage reaches zero and power is cut off from the motor, as the electrical position of the rotor of the receiver comes into agreement with the positioning signal across the stator. Similar mechanism for turning each of the other vehicle wheels 32, 33, and 34 is provided adjacent the respective wheels.

A pointer or direction indicator 83 is preferably provided at one or both of the wheels adjacent the operator's station, that is, wheels 31 and 32, so that the operator may know the positons of the wheels at all times. The pointer 83 may be fixed on the upper end of an upward extension of the swivel shaft 76 of the associated wheel or be otherwise rotatably mounted and connected to the bull gear 75 or shaft 76 by any suitable means which will turn the pointer in correspondence to the wheel, with the pointer maintained in the same vertical plane as the wheel, or in a parallel plane. All four of the wheels may, of course, be provided with the pointers 83, if a sufficiently clear reading thereof can be made from the operator's station 28 to be of value.

When the vehicle 20 is operated on rough, pitted, or pocked surfaces, or on slotted decks of ships, the directional turning of the wheels may be very difficult or even impossible by reason of engagement of one or more of the wheels in a depression or depressions, particularly when a relatively sharp turn is desired. To overcome this difficulty, the vehicle 20 may be provided with a hydraulic jack 85 adjacent each of the four wheels, as shown in FIGURES 1 and 2. Pistons with enlarged foot portions 86 project downwardly from vertically mounted cylinders in the vehicle body, normally in a retracted position spaced above the surface on which the vehicle operates, as shown in FIGURE 2. If turning of the wheels is impeded, as explained above, the vehicle is stopped, and the jacks operated to project the pistons downwardly against the operating surface and raise the vehicle sufficiently so that the wheels clear the obstruction. Turning of the wheels may then be accomplished in the manner described hereinabove, the jacks 85 operated to retract the pistons and lower the vehicle onto the operating surface again, and progress of the vehicle resumed. The jacks 85 may be connected to a hydraulic system for operating the fork lift apparatus 23, and controlled by an appropriate lever or like means included in the control means 27.

The disclosed steering apparatus is adapted for effecting crab steering of the vehicle 20, or in other words movement of the vehicle in a straight line transverse of either its longitudinal or transverse axis, as for example in an oblique direction as indicated by the arrow C in FIGURE 13. In such steering, while the vehicle may be turned so as to follow other than a straight-line path, the body of the vehicle does not rotate, the turning being accomplished by turning all four wheels relative to the body to extend in the direction in which movement of the body is desired. It will be understood that the crab steering mode C may be along any desired direction relative to either axis of the body. It may be along either the longitudinal or transverse axis of the body if desired, or any intermediate direction line. All four wheels are always in parallel planes or, in other words, at the same angle to the body and are turned in the same direction and to the same extent when changing the course of the vehicle. Thus, if the vehicle were being driven in the crab steering mode C in a direction along its longitudinal axis, and a right angle turn to the right were made, all four wheels would be turned from a position paralleling the longitudinal axis to a position paralleling the transverse axis of the vehicle, and the vehicle would then travel at 90° to its previous course. While the vehicle body on the original course was moving with a short side or end foremost, it would after the turn be moving with a long side foremost. In other words, it would be moving along its transverse axis instead of its longitudinal axis.

Turning of the wheels in mode C is effected by the turning mechanism already described, and requires only a single synchro transmitter to control the synchro receivers 65 for the several wheels. The transmitter 87, as will be evident from FIGURE 10, need only be connected to the four receivers 65 in the same phase relation to effect turning of the wheels in the same direction at the same time, and to the same extent, in accordance with the direction and degree of rotation of the transmitter shaft. Turning of the transmitter shaft to provide the desired positioning signal may be accomplished simply by securing on the shaft a circular plate or disc 88 against which engages the periphery of a friction disc 89, which may be the friction disc 62, or one similar thereto, arranged for rotation by the steering handle through the gearing described, or by similar means. It may be noted that the transmitter shaft may be rotated through a full circle, or even more, and thus position the wheels of the vehicle for travel in any desired direction. The transmitter 87 may be one of the transmitters 36 or 38, with the circular plate 88 substituted for the drive plate 44, or 48, the associated linkage disconnected, and connections to the receivers 65 made as described.

Another advantageous mode of steering the vehicle 20 is in a rotary movement about a vertical axis centrally of the wheels, or in other words within the confines of the area occupied by the vehicle. In FIGURE 14, this mode of steering of the vehicle 20 is indicated by the dotted circle designated D, which is centered on the vertical axis 90. It will be noted from FIGURE 14 that the vertical axis 90 in the present case does not extend through the body proper of the vehicle 20, falling within the open space or recess occupied by the fork lift apparatus, defined by the central and side portions of the body. It will be apparent that this axis may have various locations, depending upon the particular arrangement of the four wheels, and might be located in the recess even farther from the central body portion than shown in FIGURE 14. The axis 90, however, falls within the confines of the vehicle, or within the area occupied by the vehicle, in the sense that it falls within the area bounded by the four sides of the vehicle, one of the long sides of which is recessed or interrupted and may be taken as the front of the vehicle, as explained hereinabove. The circle D representing the rotary or spinning steering mode of the vehicle passes through the swivel axes of the four wheels, the vertical planes of the wheels being tangent to this circle, so that the horizontal axes of the wheels, or in other words the axes of the wheel axles 79, intersect at the axis 90. In the present case, the wheels are arranged rectangularly, that is, with their vertical swivel axes defining the corners of a rectangle, and accordingly the axles of alternate or diagonally opposite wheels are in coaxial relation when the wheels are turned to the steering mode D position. The wheels might be otherwise arranged or located, however, and would still be disposed with their vertical planes tangent to the circle, and with their axes intersecting at the vertical axis 90. When the wheels 31 to 34 inclusive are in the rectangular arrangement disclosed, they may be controlled by a single synchro transmitter, as in the case of the crab steering mode C discussed hereinabove, employing the steering control receiver 65 for each wheel is connected to the transmitter 87 in the phase reverse to that of the receiver of the next wheel, so that while all the wheels turn the same amount to the tangent position mentioned, adjacent wheels turn in opposite directions to reach the desired positions.

When the vehicle wheels are not in the rectangular arrangement, but are located symmetrically relative to one or the other of the vehicle axes, or when the turning center is on an axis of symmetry relative to the four wheels but not centered relative to the wheels, steering control means such as those indicated generally at 91 in FIGURES 11 and 14 may be employed to effect steering in the rotary steering mode. A pair of synchro transmitters 92 and 93 are mounted in laterally spaced relation, and a gear is mounted on the shaft of each. Assuming that the wheels are symmetrical about the longitudinal axis of the vehicle, one of the transmitters is connected to the synchro receivers 65 of the wheels 31 and 32, and the other to the receivers of the wheels 33 and 34. It will, of course, be understood that connections of the synchro transmitters 92 and 93 to the synchro receivers 65 of the several wheels are in the successively reversed phase relationship already explained. The gear 94 on the shaft of transmitter 92 meshes with the gear 95 on the shaft of transmitter 93, the gear 94 being driven by means of a suitable plate 96 fast on the transmitter shaft, engaged by the periphery of a friction disc 97, which may be the same as the disc 62 or 89, or a similar one. An arrangement such as that previously described including the steering handle 55 may be employed to rotate the friction disc 97 and thereby the gears 94 and 95. It will be evident that the shafts of the transmitters 92 and 93 are rotated in opposite directions by reason of the gears 94 and 95, the degree or amount of rotation of each relative to the other being determined by the gear ratio. In FIGURE 11, the gears 94 and 95 are shown as of the same diameter, so that the transmitter shafts would be turned equally. In such case, the steering control means 91 would serve as an alternate for the single transmitter arrangement for controlling the rotary steering mode D.

If the wheels 33 and 34 are to be rotated through a smaller angle than wheels 31 and 32 in order to reach the position tangent to the circle D, the gear 94 of the transmitter 92 controlling these two wheels is made smaller than the gear 95 to obtain a gear ratio corresponding to the difference in rotation between the two pairs of wheels necessary for power positioning of all four wheels.

If the wheels are not symmetrically located on the vehicle, the number of transmitters is increased to that required to assure that each wheel will be rotated through its respectively necessary arc to come to the proper position for rotary or spinning steering of the vehicle. It will also be understood that, if desired, the transmitters 92 and 93 may be one of the pairs 36, 37, or 38, 39 as disclosed in FIGURES 3 and 4, and connected by linkage as disclosed hereinabove for rotating the shaft of each transmitter a predetermined amount corresponding to the arcs through which the wheels respectively controlled thereby must be rotated to reach the desired steering position.

The same arrangement and operation are employed when the center about which the vehicle is to be turned is unsymmetrically located, whether off an axis of symmetry of the four wheels in mode D steering, or off a perpendicular to the steering axis as in mode A or B steering, and whether within or outside of the confines of the vehicle.

In FIGURE 15, there is diagrammatically illustrated two-wheel steering mode, which is in effect two modes corresponding to the longitudinal and transverse steering modes A and B hereinabove described, but employing only two wheels for steering in either case. The positions of the wheels for two-wheel steering in the manner of mode A are shown in solid lines, and the positions in the two-wheel steering arrangement corresponding to mode B are shown in dotted lines. In the first case, the wheels 31 and 32 are shown as selected for steering, and the wheels 33 and 34 as being employed only as trailing wheels, although it will be understood that this might be reversed and the wheels 33 and 34 employed for steering. Similarly, in two-wheel steering corresponding to mode B, the wheels 31 and 34 are shown as employed for steering, with the wheels 32, 33 as trailing wheels, although this again might be reversed.

Two-wheel steering may be advantageous in several situations, as for example when the vehicle 20, moving in the direction along its longitudinal axis, is close alongside a wall W or the like, and it is desired to turn the vehicle away from the wall. It will be apparent that with four-wheel steering the vehicle body would rotate or turn in such a manner as to bump the wall, which of course is quite undesirable. It will be appreciated that the wall W may represent one side of a relatively narrow aisle along which the vehicle is to move for turning into an intersecting aisle. By using only one pair of wheels for steering, the trailing end of the vehicle rotates only a minor amount, and it is thus possible to turn the vehicle without encountering the wall or similar obstacle. Two-wheel steering is also advantageous in some situations involving considerable back-and-forth maneuvering of the vehicle to reach a particular position when there is little space for maneuvering. The steering control means for two-wheel steering may be the control means 35 already disclosed, employing the pair of transmitters 36, 37 or 38, 39 corresponding to the particular steering mode, with the wheels not employed for steering having the synchro receivers 65 thereof disconnected from the respective transmitters. This, obviously, can readily be accomplished by simple switch means.

If differential turning of the steering wheels is not desired, a single synchro transmitter such as the transmitter 87 may be employed, alternatively connectable to the wheels 31 and 32, or the wheels 31 and 34, depending upon the steering mode employed. Again, switch means may be provided for connection and disconnection of the transmitter to or from the several receivers 65 of the several wheels.

As has already been pointed out, the trailing pair of wheels may be employed as the steering wheels if desired, the same steering control means being employed but with the connections made to the receivers of the wheels illustrated as the trailing wheels.

The steering apparatus may be employed with electrical cable guide systems to steer the vehicle along a predetermined path. In such automatic guidance systems, a vehicle is provided with a plurality of coils disposed in angular or offset relation to each other, and arranged for sensing the field of an electrically charged cable which defines the path to be followed by the vehicle. Deviation of the vehicle from the path indicated by the cable results in changes in the fields of the coils to effect compensation for the deviation and return the vehicle to the desired path. Such automatic guidance or electrical "sniffer" systems may be employed to control the steering apparatus of the present invention. The cable field sensing coils of such a system may be connected to the synchro transmitters of the apparatus as hereinabove disclosed, in such manner that the output of the sensing coils is applied to the transmitter means to effect positioning of the rotor means hereof in accordance with the variations in the fields of the sensing coils. This, of course, will cause a response by the synchro receivers as has already been explained. The result is that the vehicle 20 is steered in accordance with the indications of the sensing coils, so as to follow the path defined by the cable. An even simpler arrangement, and therefore perhaps a preferable one, is the connection of the sensing coils of the automatic guidance system directly to the synchro receivers of the wheel turning means to apply thereto a positioning signal. This causes operation of the receivers to turn the wheels in response to the signal in the same manner as hereinabove explained, the receivers each producing an output voltage which is brought to zero as the rotor turns to correct the error and thereby drives the turning means to turn the associated wheel to the desired position. It has not been thought necessary to illustrate this arrangement of the automatic guidance system employing the present steering apparatus, since the manner of doing so will be readily apparent to one skilled in the art. It will be appreciated that, as the sensing coils of a vehicle used in an automatic guidance system may replace the synchro transmitters, other signal-responsive means than the synchro receivers may be employed for effecting or controlling turning of the wheels to the desired steering positions by the wheel turning means; and of course the transmitters might be replaced by other means than the sensing coils. Thus, the synchros specifically disclosed herein, while desirable and advantageous because of their cheapness, simplicity, and reliability, may have substituted therefor other suitable means adapted for performing the functions thereof.

While I have illustrated and described what I regard to be the preferred embodiments of my invention, nevertheless it will be understood that these are merely exemplary and that numerous modifications and rearrangements may be made therein without departing from the essence of the invention.

I claim:

1. Steering mechanism for a wheeled vehicle having two pairs of ground-engaging wheels, comprising means mounting each of said wheels for directional turning through substantially 360° about a vertical swivel axis, means for turning each of the wheels about its swivel axis including a gear rotatable about said axis, an electric motor for each wheel, means drivingly connecting each said motor and its corresponding gear, means to control operation of each motor comprising a synchro receiver for each wheel adapted to develop an electrical output, means for amplifying the output of each receiver and applying the amplified output to the associated motor to effect actuation thereof for rotating said gear, feedback mechanism responsive to movement of the gear effecting corresponding positioning movement of the receiver, synchro transmitting means, steering means operatively connected to said transmitting means for actuation thereof, and means for selectively transmitting positioning signals from said transmitting means to said receivers to effect relative turning of the wheels in one of a plurality of steering modes.

2. Steering mechanism for a wheeled vehicle having a plurality of ground-engaging wheels, comprising means mounting each of said wheels for directional turning through substantially 360° about a vertical swivel axis, means for turning each of the wheels about its swivel axis, means to control operation of each turning means comprising a synchro receiver for each wheel adapted to develop an electrical output, means for amplifying the output of each receiver and applying the amplified output to the associated turning means to effect actuation thereof, feedback mechanism responsive to movement of the turning means effecting corresponding positioning movement of the receiver, synchro transmitting means operatively connectible to said receivers for applying positioning signals thereto for development of said electrical output thereby, steering means operatively connected to said transmitting means for actuation thereof, and means for selectively transmitting positioning signals from the transmitting means to the receivers.

3. Steering apparatus for a wheeled vehicle having two pairs of ground-engaging wheels, comprising means mounting each of said wheels for directional turning through substantially 360° about a vertical swivel axis, means for turning each of the wheels about its swivel axis including a gear rotatable about said axis and an electric motor with means drivingly connecting said motor and gear, means to control operation of each motor comprising a synchro receiver for each wheel adapted to develop an electrical output, means for amplifying the output of each receiver and applying the amplified output to the associated motor to effect actuation thereof for rotating said gear, feedback mechanism responsive to movement of the gear effecting corresponding positioning movement of the receiver, a first pair of synchro transmitters each operatively connected to the receivers for the wheels of one of said pairs of wheels to apply positioning signals thereto for development of an output thereby, a second pair of synchro transmitters each operatively connected to the receiver for one wheel of each pair of wheels to apply positioning signals thereto, said transmitters of said first and second pairs each having a rotor, a first differential linkage system connecting the transmitters of said first pair for differential positioning of the rotors thereof to produce differing positioning signals, a second differential linkage system connecting the transmitters of said second pair for differential positioning of the rotors thereof to provide different positioning signals, steering means operatively connected to said linkage systems for actuation thereof, and means for selectively transmitting electrical energy from an energizing source to said first and second pairs of transmitters, whereby steering of said vehicle in a plurality of modes may be accomplished.

4. Steering apparatus for a wheeled vehicle having two pairs of ground-engaging wheels, comprising means mounting each of said wheels for directional turning through substantially 360° about a vertical swivel axis, means for turning each of the wheels about its swivel axis including a member rotatable about said axis, an electric motor for each wheel, means drivingly connecting each said motor and its corresponding member, means to control operation of each motor comprising a synchro receiver for each wheel adapted to develop an electrical output, means for amplifying the output of each receiver and applying the amplified output to the associated motor to effect actuation thereof for rotating said member, a first pair of synchro transmitters each operatively connected to the receivers for the wheels of one of said pairs of wheels to apply positioning signals thereto for development of an output thereby, a second pair of synchro transmitters each operatively connected to the receiver for one wheel of each pair of wheels to apply positioning signals thereto, first differential means connecting the transmitters of said first pair for differential positioning thereof to produce different positioning signals, second differential means connecting the transmitters of said second pair for differential positioning thereof to produce different positioning signals, steering means operatively connected to said first and second differential means for actuation thereof, and means for selectively transmitting electrical energy from an energizing source to said first and second pairs of transmitters.

5. Steering apparatus for a wheeled vehicle having two pairs of ground-engaging wheels, comprising means mounting each of said wheels for directional turning through substantially 360° about a vertical swivel axis, means for turning each of the wheels about its swivel axis, means to control operation of each turning means comprising a synchro receiver for each wheel adapted to develop an electrical output, a first pair of synchro transmitters each operatively connectible to the receiver for one wheel of each pair of wheels to apply positioning signals thereto for development of an output thereby, a second pair of synchro transmitters each operatively connectible to the receiver for one wheel of each pair of wheels to apply positioning signals thereto, means for applying differential inputs to the transmitters of each pair for production of different positioning signals by the respective transmitters of each of said pairs, steering means operatively conected to said input means for actuation thereof, and means for selectively transmitting electrical energy from an energizing source to said first and second pairs of transmitters.

References Cited by the Examiner
UNITED STATES PATENTS

| | | | |
|---|---|---|---|
| 2,168,575 | 8/1939 | Newell | 318—19 |
| 2,424,288 | 7/1947 | Severy | 180—79.2 |
| 2,666,177 | 1/1954 | Brannen et al. | 244—77 |
| 3,031,024 | 4/1962 | Ulinski | 180—6.5 |
| 3,087,564 | 4/1963 | Quayle | 180—79.2 |

BENJAMIN HERSH, *Primary Examiner.*

A. HARRY LEVY, *Examiner.*